United States Patent Office 3,429,416
Patented Feb. 25, 1969

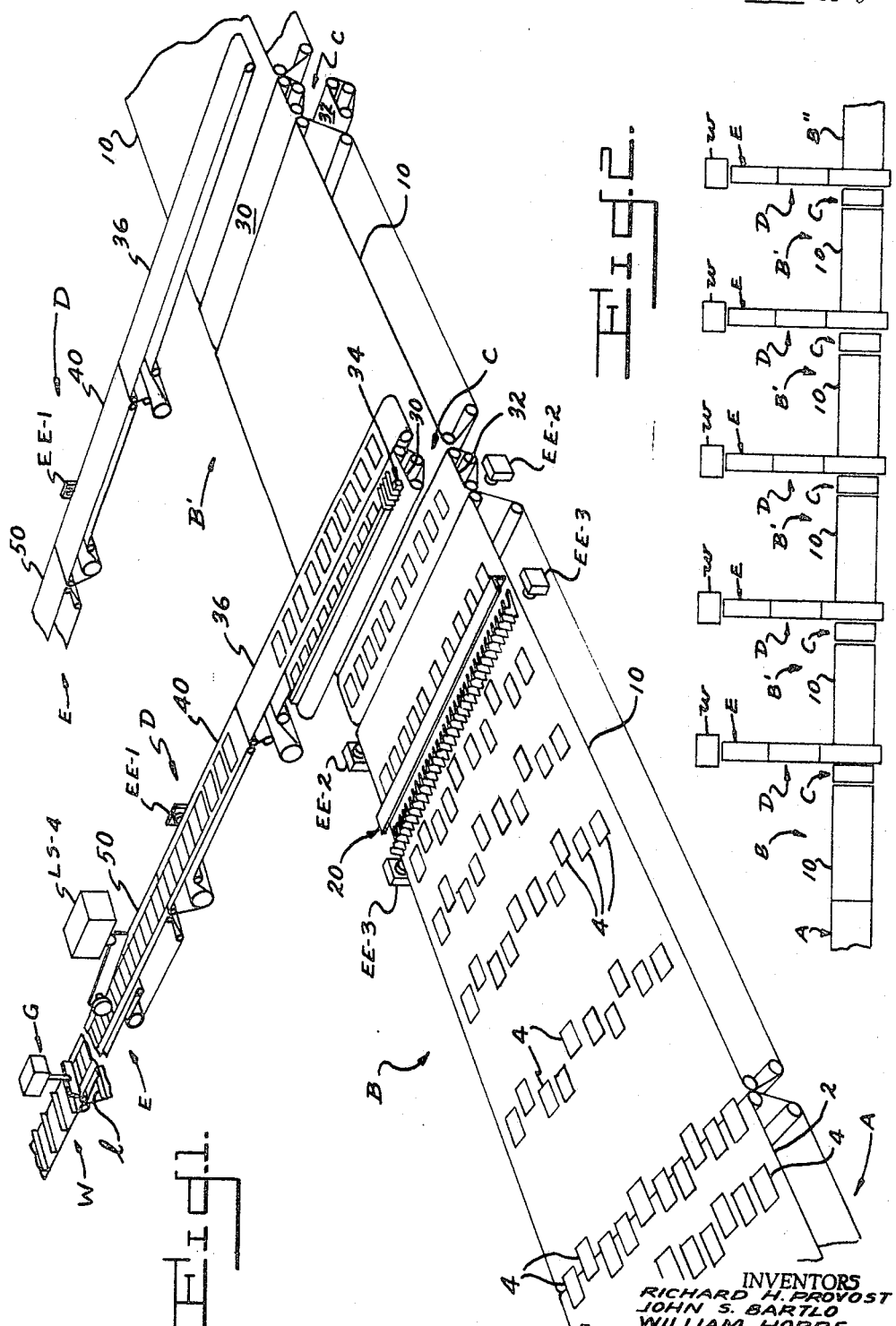

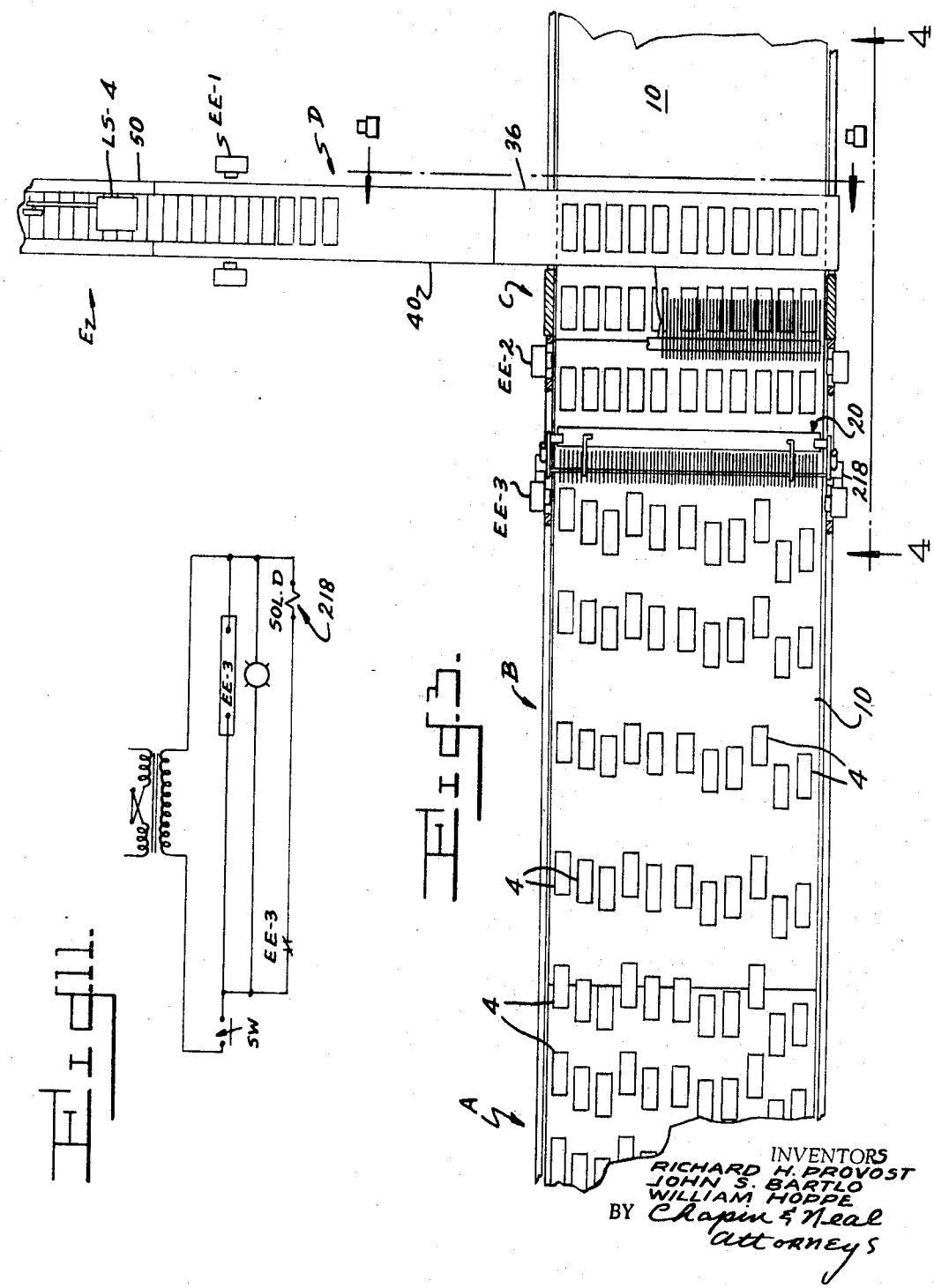

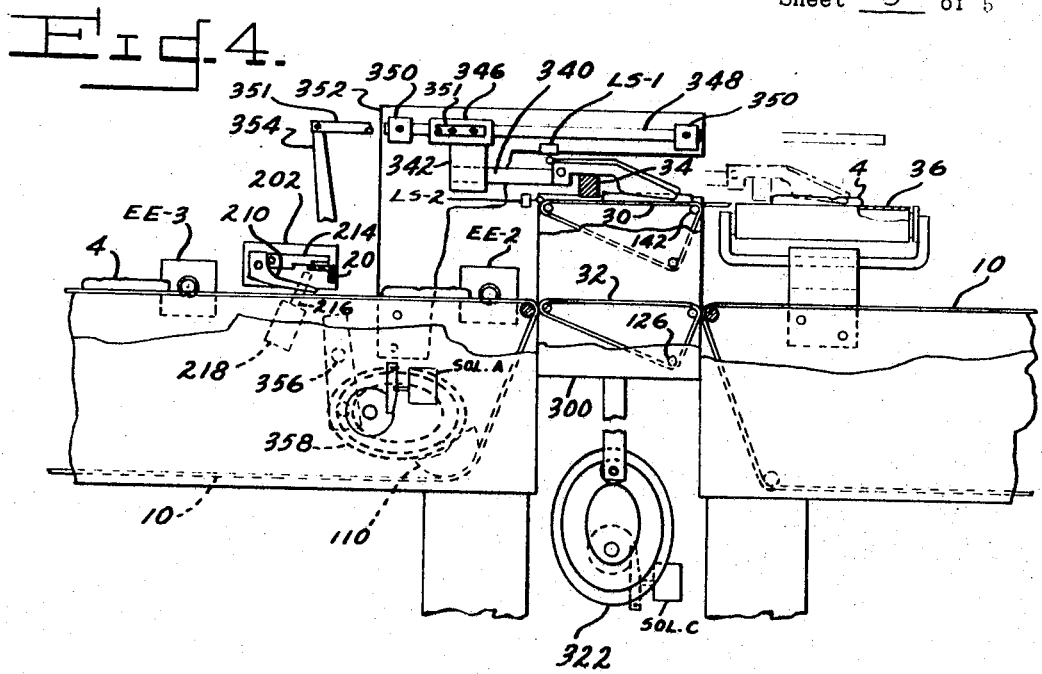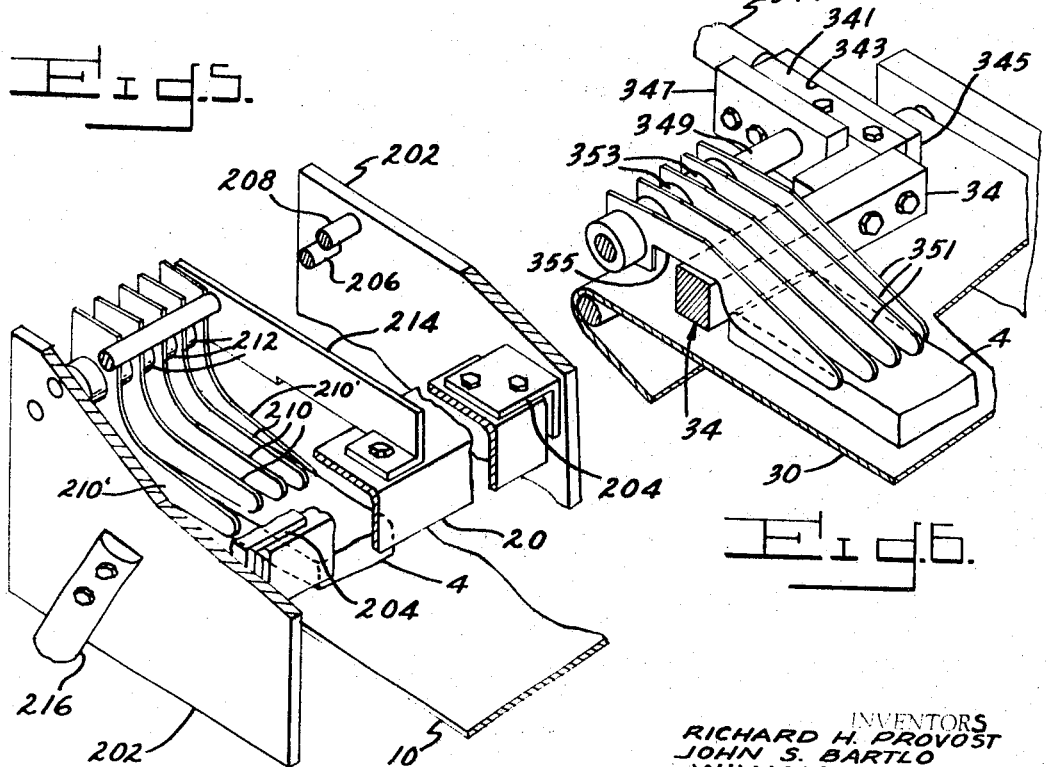

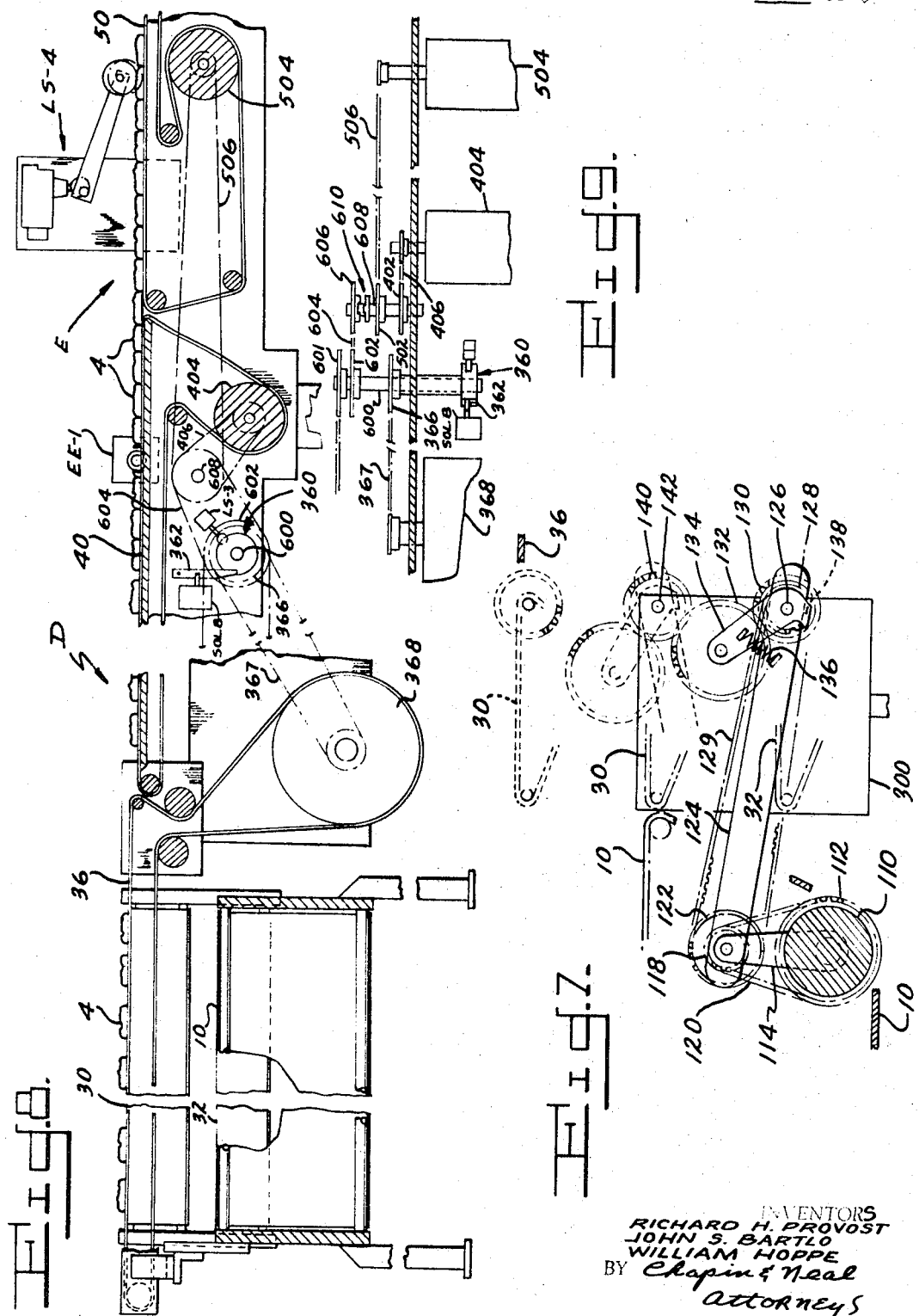

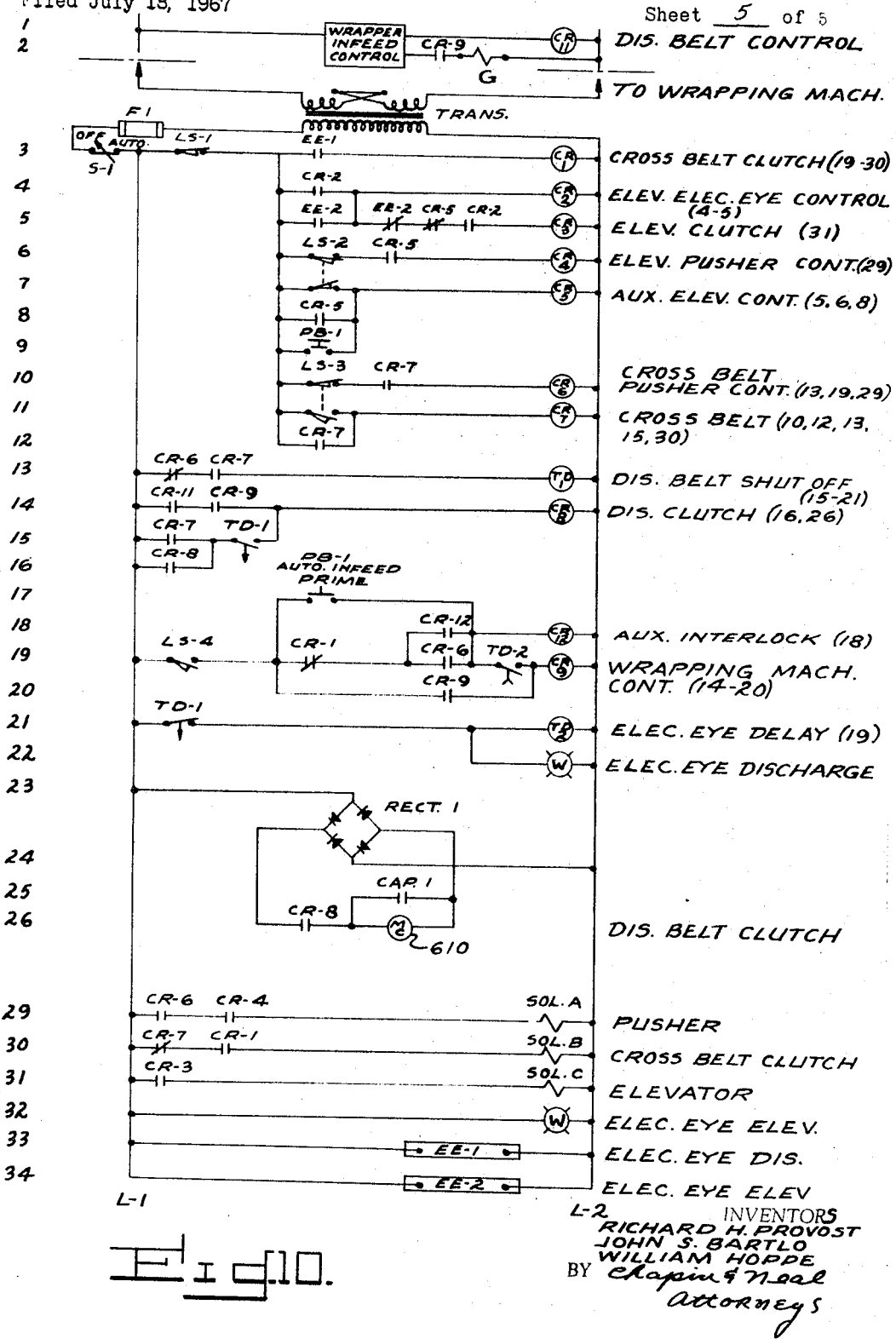

3,429,416
TRANSFER CONVEYOR APPARATUS FOR CANDY BARS AND THE LIKE
Richard H. Provost, Shrewsbury, and John S. Bartlo and William Hoppe, Longmeadow, Mass., assignors to Package Machinery Company, East Longmeadow, Mass., a corporation of Massachusetts
Filed July 18, 1967, Ser. No. 654,164
U.S. Cl. 198—20   10 Claims
Int. Cl. B65g 47/00, 47/26

ABSTRACT OF THE DISCLOSURE

Apparatus for distributing candy bars received in rows cross-wise on a conveyor, to one or more in-line wrapper feeding stations, comprising longitudinally spaced horizontal receiver belts with candy row aligning means, a transfer and elevator pick-up mechanism at the downstream end of each receiver belt with elevated pusher mechanism for depositing candies on a cross belt for an in-line delivery to a discharge belt and an infeed adapter belt station. Elevator, discharge belt, and infeed belt scanning means with interlocking switch circuitry control the pick-up and step by step advance of candies to automatically maintain a supply thereof at each infeed station.

Background

This invention relates to apparatus for the delivery of articles, such as candy bars and the like, to a plurality of wrapping machine infeed stations. In particular it relates to apparatus for receiving a continuous supply of articles placed cross-wise in rows on a conveyor and for automatically transferring on demand, the rows of articles to one infeed station, or to each of several aligned infeed stations, in such a way that a sufficient number of articles may be supplied in an in-line relation at each station or stations and insure substantially continuous operation of the wrapping machine or machines. The number of infeed stations required is, of course, related to the number of wrapping machines needed to handle the expected production of a given candy making machine.

Heretofore in the prior art it has largely been the normal practice to feed candy bars and like articles into a plurality of wrapping machines by hand as the bars are conveyed along a discharge belt leading from the candy making machinery. Candy making machines having higher rates of production and consequently delivering bars in volume at a fairly rapid rate have until recently merely meant additonal hand labor to feed an increased number of wrapping machines. However, as wrapping machines have been developed to handle and wrap bars with greater efficiency and at higher rates of production, the point has been reached where manual feeding cannot provide an infeed supply commensurate with wrapping machine capacity. Accordingly, manual feeding now fails to utilize the full potential of the wrappers. Accordingly, in general, it is a principal object of the present invention to provide apparatus for transferring bars from the candy making machinery to a wrapping machine or machines automatically.

It may be noted that in recent years machines for accomplishing the general object above set forth have been proposed. Insofar as is known, however, major difficulties have been encountered in the capacity of such automatic machinery to adequately control the disposition of the bars and with unfailing accuracy complete a transfer from the candy maker to the wrapper infeed.

Typically the candy machinery delivers the bars in rows disposed transversely on a conveyor belt, as an enrober or cooling belt, and the individual bars of the rows are randomly spaced transversely and staggered to some extent longitudinally as well. From this general disposition the bars must be re-aligned and conveyed to wrapper infeed stations and placed as in single file abutting relation for acceptance by the wrapping machine infeed for timed sequential handling. Accordingly, specific objects of the present invention are to provide for alignment of the bars as they are received from the candy maker conveyor, arrange for preserving the alignment thereof when removing the bars from the conveyor and transporting them to a cross conveyor system for single file handling to an infeed station, and to provide for interlocking signaling apparatus to sense the need for bars and permit the various components to operate only on demand and in addition only when the next succeeding component is ready and in condition to accept bars.

Figures

FIG. 1 is a pictorial view in schematic form at one end of a delivery apparatus embodying the invention and illustrating a flow of articles from a source of supply, to a first conveyor section, into an elevator take-off section, and from the elevator into the delivery station for the wrapping machine infeed;

FIG. 2 is a line diagram showing a floor plan of a typical apparatus;

FIG. 3 is a plan view of conveyor apparatus illustrated by FIG. 1;

FIG. 4 is a side elevational view, as on line 4—4 of FIG. 3, showing the alignment gate and elevator sections of the apparatus;

FIG. 5 is a fragmentary perspective view showing detail of the alignment gate elements;

FIG. 6 is a similar view showing detail of the pusher mechanism for delivery of articles from the elevator;

FIG. 7 is a diagrammatic view showing the drive means for actuating the belts of the elevator section shown by FIG. 4;

FIG. 8 is a view taken on line 8—8 of FIG. 3;

FIG. 9 is a schematic top plan view showing the driving connections for operation of the belts shown by FIG. 8;

FIG. 10 is a wiring diagram showing the control circuitry for the apparatus of the elevator and delivery mechanism; and FIG. 11 is a wiring diagram of the alignment gate circuit.

In broad outline the major sections of the apparatus shown by the several figures (see particularly FIGS. 1 and 2) have been designated as follows: arrow A indicates the source of articles as rows of candy bars; arrow B and B' indicate infeed conveyor belt means having longitudinally aligned conveyor sections arranged in endwise spaced relation; arrows C indicate identical elevator removal sections positioned between adjacent infeed conveyor end sections for removing articles from a conveyor, on demand, to supply a wrapping machine infeed or, in the absence of such demand, for transferring a row of articles to a subsequent conveyor section; arrow D at each wrapper station indicates a discharge conveyor belt section which receives its supply from each elevator section; and arrow E indicates an infeed adapter conveyor belt section coupled to a discharge conveyor section D for directing articles into the infeed of a wrapping machine unit W.

FIG. 2 is a line sketch of a floor plan installation having a series of five wrapping machines W arranged in a row with the delivery apparatus of the present invention located to receive rows of candy bars and regulate the delivery thereof to each of the machines in accordance with its rated capacity for wrapping bars. For purposes of illustration and assuming an expected upper limit production rate of delivery at A from the candy bar making machinery of 600 pieces per minute and a maximum capacity of each wrapping machine W to handle 150 pieces per minute, it will be appreciated that under ordinary conditions four wrapping machines would be sufficient to handle the assumed total expected input. In such case, however, a fifth machine is considered desirable as a standby in the event one of the other machines were to be shut down for repairs or otherwise. The floor plan as illustrated will serve to indicate the general considerations which govern the desirable number of wrapping machines for any given installation. It will also be realized that wrapping machines W may be at either side of the main conveyor sections 10 and the discharge action directed accordingly, all as may be desired by a given installation. As an emergency measure a conveyor section B'' is indicated at the extreme end of the line and may be considered as leading to a collecting bin (not shown) in the event of a simultaneous major breakdown of a majority of wrappers.

Referring now to FIG. 1 the progress of articles from source A to the first of a series of wrapping machines W is schematically illustrated. Except for an alignment means on conveyor belt section B, as will be described, the operations of the various sections are identical and will now be described with particular reference to FIG. 1.

The source or supply area at A shows the outlet end of a conventional enrober or cooling belt 2. On this belt are transverse rows of candy bars 4. The bars in each transverse row are laterally spaced in more or less random fashion. The leading edges of the bars in each row are also unevenly positioned. As will be understood the enrober belt is continuously operated by a conventional drive and functions to carry bars from a chocolate coating process and then through a cooling period. As the bars arrive at the outlet area A the rows are travelling at a relatively slow speed, are characteristically closely spaced longitudinally, and are arranged in an uneven staggered manner with each row being uniformly uneven as shown.

As the rows pass from belt 2 onto conveyor belt 10 of section B, the various bars 4 are picked up by the latter which is also driven by conventional mechanism not shown but at an increased rate of travel. Also, because the candy bars may or may not stick to belt 2 in varying degrees the staggered character of the bars in each row may in fact be altered. In any event, the longitudinal spacing of each row of staggered bars from its next succeeding row is greatly increased and the longitudinal spacing of the bars within each transverse row is likewise increased. This will be evident from the relative positions of the rows shown on belt 2 and on belt 10. The greater spacing on belt 10 permits a momentary stopping of each row on the belt to align the leading edges of the bars as will be described. This spacing further allows a timed operation of the elevator removal mechanism to lower an elevating belt; pick up an aligned row of bars from the end of conveyor belt 10; and then return to an upper position before the arrival of the next succeeding row at the downstream end of belt 10. Thus the next succeeding row of bars may be conveyed at the conveyor 10 level to the next conveyor belt 10 of section B' by a lower transfer belt at the elevator section.

In FIG. 1 the aligning element for lining up the leading edges of the candy bars is at 20; the upper elevating belt for removing rows is at 30; and the lower belt for transferring rows to a subsequent conveyor section is at 32.

The action to lower the elevating belt 30 is triggered on demand by signalling mechanism indicating the absence of a row of bars on this belt 30 as will be later described. Further progress of a row of bars when picked off conveyor 10 and raised to its upper level by belt 30 is accomplished by pusher mechanism generally designated by numeral 34 and located immediately above the upper level. Pusher 34 sweeps over belt 30 and pushes the row of bars onto a cross belt 36. Belt 36 is driven in a transverse direction relative to conveyors 10; and when candy bars are called for by the signalling mechanism, belt 36 thus discharges the bars in a now longitudinally aligned arrangement to a discharge belt 40.

Belt 40 may be of a wire mesh type or other suitable type having a minimum friction surface. It is driven at the same speed as belt 36. Thus it initially receives candy bars in the same spaced relation as when they were deposited on cross belt 36. However, this spacing in normal operation is eliminated by action of a belt 50 (also of wire mesh or other type having suitable minimum friction surface characteristics) at wrapper infeed adapter section E, aligned with belt 40 of discharge section D. Belt 50 is driven at a slower rate of travel than belt 40. As will be readily understood, the infeed of individual articles in a standard wrapping machine operation is in a timed sequence, some form of gate or pick-off mechanism serving to momentarily hold the bars on belt 50 until each leading bar is fed into the wrapper infeed structure. Accordingly, since belt 50 travels at a slow speed and bars are fed from belt 40 at a higher speed, each of the following bars rapidly catch up with those ahead of them on belt 50.

Thus, as shown by FIG. 1, the bars on belt 50 are presented in abutting relation. It will also be seen that as a supply of bars from cross belt 36 arrives on belt 40, such supply normally being in excess of the number being accepted by the wrapper infeed, the line of contacting bars will extend, as shown, back onto belt 40. As previously mentioned, belts 40 and 50 are of a relatively frictionless surface construction. The moving belts will thus slide freely under the bottom surfaces of the candy without adverse effect whether the bars are stationary or being advanced as each leading bar is accepted by the wrapper infeed.

The movement of the rows of candy bars from the conveyor section into each wrapper infeed area as thus far generally described as identical for each station. It will be appreciated, however, that once the leading edges of a row have been properly aligned by the gate 20 of section B, the rows will normally advance on the successive conveyor belts 10 without need for further realignment. If needed, however, a second alignment gate means may be provided on any one of the belts 10. The various operations of the various components will now be described in greater detail.

The alignment gate component for lining up the leading edges of a row of bars is in spaced relation to the downstream end of conveyor belt 10. It is to be noted that the alignment gate is independent of the elevator pick up mechanism and hence, may be positioned at any location ahead of the location shown in advance of the elevator at EE–2. The previously mentioned element 20 of the gate is conveniently an angle iron supported on vertically movable plates at each side of belt 10 for dropping into the path of travel of the bars. This lowered position is held momentarily for a timed interval sufficient for all leading edges of the bars of a row to strike the gate. The gate is then raised for passage of an aligned row to the downstream end of conveyor 10 and past the eye EE–2.

Associated with alignment bar 20 is a series of laterally aligned closely spaced fingers carried on the side plates which lower and raise alignment gate 20. Referring to FIG. 5, the side plates are at 202. The ends of bar 20 are anchored thereto by brackets 204. Also shown as supported on plates 202 are the ends of a hanger rod 206 and a finger positioning rod 208. Rod 206 carries a series of closely spaced L-shaped fingers 210 which are freely pivoted thereon and separated by integral bosses 212 on fingers 210. Rod 208 is upwardly and forwardly of pivot 206 and forms a positioning stop to prevent the fingers from falling into contact against the surface of conveyor belt 10. As will readily be seen from FIG. 5 each candy bar entering the gate area will contact certain of the fingers to pivot them upwardly on rod 206 while the fingers adjacent to each side of the bar will remain in a "down" position and prevent any "fishtailing" action of the candies. Thus the longitudinal position thereof in alignment with the path of conveyor 10 travel will be preserved. The fingers as at 210' at each side of the bars maintain such aligned relation while gate 20 holds bars for the transverse alignment of the leading edges of all bars and until a row is released by raising the gate.

Auxiliary support structure between the side plates 202 is shown by a brace 214 which may be anchored to gate 20 at one end and be hung on rod 208 at its other end. Rod 206 may also be supported by the brace 214. A plurality of braces may be provided between plates 202 as may be desirable for the rigid support of the gate and fingers.

The gate and finger structure is supported entirely by plates 202 and is raised and lowered in timed relation by a lifter rod 216 actuated in response to energizing a solenoid controlled by the facing electric eye or scanner elements indicated at EE-3 (FIG. 1). The lifter rod 216 is raised and lowered by a cam driven by a standard single revolution clutch type of drive. This drive is indicated at 218 (FIG. 4).

The timed cycle of dropping to hold, dwelling to align, and lifting to release is triggered by the first leading edge of each row of bars as it strikes the beam EE-3. Since each row of bars is uniformly staggered, the timing of the dwell period may be set as necessary and will insure a sufficient time for each alignment period. A row of candies, when released by the gate is conveyed to a second electric eye scanning or sensing area at the end of conveyor 10. This second eye, shown by scanners EE-2 (FIGS. 1 and 4), is included in the elevator removal area mechanism which also includes elevator belt 30, pusher 34, and cross belt 36. A row of candies breaking the beam of EE-2 energizes a solenoid which will serve to actuate a single revolution clutch type of drive to operate the elevator. The elevator normally is in its upper position with belt 30 at the same level as cross belt 36. When the solenoid is energized it causes the elevator belt 30 to be lowered to receive a row of candies during a dwell period and then to be raised to its upper position again. The timing is such that the elevator cycle is completed in sufficient time to permit a next succeeding row of candy bars on conveyor 10 to be received by the lower transfer belt 32 at the level of conveyor 10 and thus passed through the removal area C to the next belt section 10 (see FIG. 4). The drive to lower and raise the elevator is schematically indicated by the cam at 322, a single revolution completing the cycle.

It is to be noted here that the lower transfer belt 32 of the elevator section is constantly driven and that the upper elevator belt 30 is driven only when lowered to pick up a row of candies from belt 10. In its upper position belt 30 is at rest. When the elevator is lowered, driving means are engaged for belt movement when candies are received from belt 10 and for a portion of the return travel to upper position. Thus, bars may be received from the end of belt 10 and moved to a desired position on belt 30 to remain there for action by pusher bar 34 as will be described.

Referring now to FIG. 7, the means for driving belt 32 and belt 30 is diagrammatically shown. The take-off for driving these belts is from the drive of conveyor belt 10, this belt as previously stated being constantly driven. The drive roll for belt 10 is at 110 being supported by the side frame structure on an axis below the conveyor level of belt 10 and elevator plate 300 carrying belts 30 and 32 (see FIG. 4).

Fixed on the shaft of drive roll 110 off the side frame is a cog belt wheel at 112 and pivotally carried on this shaft is a vertically disposed link 114. At the upper end of link 114 is a cog belt wheel 118 driven from wheel 112 by a belt 120.

Also carried at the upper end of link 114 and fixed on the shaft driven by belt 120 is a belt wheel 122. An arm 124 is pivoted at one end on the link and at its other end is pivotally connected to the shaft of a drive roll at 126 of lower belt 32. Fixed on this latter shaft is a belt wheel 128. Cog belt 129 drives wheel 128 from wheel 118 and thus drives belt 32 constantly.

Fixed on the shaft of drive roll 126 is a toothed gear 130 in mesh with an idler gear 132 carried by a short arm 134 which is pivoted on the shaft of roll 126. Short arm 134 is in acute angular relationship with arm 124 and yieldably held at the angle shown by a compression spring 136 fixed between lugs on arms 124 and 134. Arm 134 is held against increasing this angle by a stop 138 projecting from the lower end of arm 134 and lodged against the underside of arm 124.

In the position of FIG. 7 with arm 124 at a downwardly directed angle from the upper end of arm 114, the elevator (with belts 32 and 30) is in its lowermost position. The teeth of idler gear 132 (driven by gear 130) are in mesh with a toothed gear 140 fixed on the shaft of the drive roll 142 of the upper elevator belt 30. Thus it will be seen that in the lower "pickup" position of the elevator, belt 30 is being driven along with belt 32 through the driving engagement of the idler gear with gear 140.

It will be further noted that when elevator 300 (carrying shaft 126 of the lower elevator belt 32 and shaft 142 of upper elevator belt 30) is moved upwardly in a vertical linear path arm 124 will swing on its pivot at the top of link 114. During vertical travel the angle of short arm 134 relative to arm 124 remains substantially constant, and thus the axis of idler gear 132 will swing to the left as arm 124 rises. During this upward movement the teeth of the idler gear will, accordingly, become separated from the teeth of the driving gear 140 of belt 30. As this occurs elevator belt 30 will cease movement in the upper portion of its travel and candy bars received from belt 10 will remain in the desired position on arrival at its uppermost level. The upper positions of belt 30 and idler gear 132 are shown by the dashed line representations, the relative separation between the two indicating that for the greater portion of travel belt 30 is stationary. On reverse or downward movement of the elevator the gear 140 will, of course, again engage idler 132 to establish the driving engagement for belt 30. Spring 136 yieldably holding short arm 134 is for the purpose of assisting in the meshing of these gears.

It will be appreciated, of course, that in FIG. 7 the upper position of the constantly driven lower belt 32 coincides with that of belt 30 at the conveyor level of belt 10.

Assuming now, as will later be described, that candy bars deposited on belt 30 and raised to the upper level are to be further advanced, the pusher mechanism 34 will be operated as soon as belt 30 reaches its top position. Referring again to FIG. 4 a limit switch, indicated as at LS-2 is tripped by belt 30 on reaching the upper position and the pusher bar 34 with aligning fingers sweeps the row of candies from belt 30 to cross belt 36. The extended position of pusher 34 over belt 36 is indicated in phantom in FIG. 4, the retracted position over belt 30 being in full line.

Pusher 34 is actuated by a solenoid operated single revolution clutch type of drive for its forward and return stroke. As indicated (FIGS. 4 and 6) bar 34 may be fixed as on the outer end of a rod 340 anchored in a block 342 (FIG. 4) which in turn is rigidly hung from a collar 346 which is mounted for sliding motion on a stationary shaft 348. Shaft 348 is affixed in spaced blocks 350 carried on a side frame member 352. A similar carriage mounting may be provided to slidably support the pusher mount at the other side of the conveyor belt.

Fixed on collar 346 is an actuating arm 351 which is pivotally joined at its driving end to the upper end of a link 354 which may be pivoted as at 356 on the framework. Link 354 may be driven as schematically shown by a cam at 358. And as will be readily understood a single revolution of the cam by a conventional solenoid operated clutch mechanism will advance and retract collar 346 for the forward and return stroke cycle of the pusher.

Referring now to FIG. 6, details of an exemplary pusher unit are shown with alignment fingers associated therewith. Rod 340 is shown provided with a squared off end at 341 anchored in a groove 343 of a carriage block 345. Block 345 has a right-angled face portion and pusher 34 is anchored thereto. In the angled portion a plate 347 is fastened and a finger carrying pivot rod 349 is fixed in the plate. On rod 349 fingers 351 are pivoted to overhang the pusher 34. Separated by integral bosses 353, the fingers as shown are recessed at their undersides, as at 355, to rest on the top of the bar. The outer ends of the fingers project forwardly thereof for contact by the candy bars 4 when the bars 4 are brought upwardly by belt 30 to its elevated position on the same level as belt 36. Contact by the upper surface of a bar will pivot the fingers upwardly while fingers 351 outwardly adjacent the edges of each candy bar will serve to hold the aligned position on belt 30. When bars are pushed off belt 30 by pusher 34 the fingers being carried with it prevent "fishtailing" and maintain the aligned relation for a positionally oriented deposit of bars on cross belt 36.

As soon as pusher 34 advances, limit switch LS–1 is tripped. The circuit is then broken for the elevator drive and for the drive of belt 36 as well. On return to retracted condition the pusher will untrip switch LS–1. Thus, LS–1 will again allow operation of either the elevator drive and/or the cross belt drive. Elevator belt 30 on return of pusher 34 at this time is, of course, empty and will operate automatically to pick up another row of candies from conveyor 10. Scanners EE–2 are actuated, however, in such manner that if the beam is already broken at the time LS–1 is untripped, the elevator solenoid circuit will be held open until such time as the scanners see light again and the beam is subsequently broken. Thus the timing to allow belt 30 to drop to the level of conveyor 10 in order to receive the next row is preserved and avoids a row of candies moving off the end of conveyor 10 while the elevator is in motion.

Assuming that a signal at discharge area D continues to call for a supply of bars, cross belt 36 will operate immediately as soon as LS–1 is untripped on return of the pusher 34, to retracted position. Belt 36 is driven (see FIG. 8) through a solenoid operated single revolution clutch drive indicated at 360. As drive 360 commences to advance belt 36 a limit switch, indicated at LS–3 is tripped. Switch LS–3 will energize a magnetic clutch to drive discharge belt 40 and the infeed adapter belt 50. This switch also gives a signal to energize a time delay. The single revolution drive to belt 36 will now empty all candies deposited on this belt and discharge them onto belt 40 which travels at the same rate as belt 36. Alternatively, the single revolution drive may be designed merely to clear the area on belt 36 for receiving a subsequent row of candies from belt 30. Belt 36, in any event, will then stop and remain stationary to receive a further supply from belt 30. The time delay remains energized, however, and will continue operation of belt 40 and of belt 50 in order to run these belts for a preset period of time. This timed period will be sufficient to advance bars along belts 40 and 50 until the final bar of candy on belt 40 passes an electric eye at EE–1 which is scanning for bars at a position spaced from the discharge end of belt 40. Bars will also be advanced onto belt 50 which as previously mentioned travels at a lower rate of speed than belt 40.

It is to be noted further that when the above mentioned time delay was energized to operate the magnetic clutch drive for belts 40 and 50, it also deenergized the circuit of EE–1. When this first time delay expires and deenergizes the clutches of belts 40 and 50 a second time delay of the scanner EE–1 circuitry is energized. This action of the first and second time delay as described should be noted as operative only on an initial start-up of the apparatus for initiating a feeding of the wrapper W and while a back-log of candies is being built up on belts 40 and 50 to start wrapper W. During normal running operation with the candies being continually supplied the first time delay will not serve to deenergize belts 40 and 50, this time delay being over-ridden by the control circuitry of a low inventory limit switch LS–4 associated with belt 50 as will be later described. In any event whenever the first time delay is operative the purpose of this second timer delay is to allow time for the eye of the scanners EE–1 to reach full brilliance before scanning for product. Thus when this second delay times out the eye EE–1 commences scanning again. If the beam of EE–1 is not broken, the circuitry for operation of a delivery of bars from cross belt 36 will again be set up.

Since the portion of the mechanism comprising belts 40 and 50 (see FIG. 7) forms an infeed portion to a wrapping machine, the discharge belt electric eye EE–1 not only is designed to call for a supply of bars when needed from the elevator removal section C, but also to form part of a signalling means to allow feeding action to take place from the infeed adapter belt 50 to the wrapper itself. The other part of such signalling means to allow feeding action to the wrapper is the low inventory limit switch indicated at LS–4 and located above the infeed adapter belt 50. Switch LS–4 is tripped (i.e., closed) when bars pass under it and continue to hold it in an elevated condition. It should be noted here that when a backlog of product holds the arm of the low inventory limit switch LS–4 in the elevated tripped position and the backlog of bars has also broken the discharge belt electric eye sensors at EE–1, this condition energizes an infeed gate means to the wrapping machine and allows candy bars to commence advancing from the outlet end of belt 50.

In such initial loading of the infeed adapter belt 50 the first bars thus continue to the end of this belt where the flow is stopped mechanically by means of an infeed gate on wrapper W. The gate is schematically shown at G in FIG. 1 and may be of any suitable design which in operation intermittently releases candy bars successively in timed relation to conveyor lugs 1 of wrapper W. Various devices are well known in the art. For simplification the gate is here shown as a reciprocable pad which may be used to release a bar and lowered to hold the next bar in timed sequence. Once a backlog of bars is built up sufficiently to commence feeding to the wrapper W as described above and the gate means is activated, belt 50 will thereafter continue to run as long as the low inventory limit switch LS–4 remains tripped and the circuitry of the wrapper machine W remains energized. Interruption of either the machine circuitry of wrapper W or a release of switch LS–4 will stop belts 40 and 50.

It will also be appreciated that in a continuing operation of feeding the wrapper W the elevator, pusher and cross belt will run through their respective cycles to supply candy bars to belt 40 as required. Scanner EE–1 will call for candies and cross belt 36 will feed a supply to belt 40 but this occurs only when scanner EE–1 does not sense the presence of candies at its position. If the eye of scanner EE–1 is blocked by candy, belt 36 will not run even if a row of candies has been deposited on it and belt 36 is ready to deliver. Likewise, the pusher will not push candies ready for delivery from belt 30 if belt 36 is loaded. Elevator belt 30 may, if empty, be lowered to receive another row of bars and then elevated with its load to the upper position. But pusher 34 will not operate to clear belt 30 until belt 36 is clear. By the same token, if belt 30 is not cleared and the pusher is retracted, the elevator may not operate. Thus, the forward progress of each particular group or row of candies from conveyor 10 through each of the successive steps to discharge belt 40 is contingent on the clearance of the preceding group of candies from the specific area to which each particular group is next advancing.

It will also be noted that if the supply of candies available from conveyor 10 is sufficient to maintain a flow to the infeed adapter area E so that the low inventory limit switch LS–4 remains tripped, then only the interruption of the circuitry of the wrapper W will stop such continued feeding operation. However, if candy bars are not supplied in sufficient quantities from conveyor 10 and switch LS–4 should be released by dropping downwardly, then the circuit of wrapper W will be interrupted. This stops delivery from the outlet of belt 50. And as previously noted, belts 40 and 50 will also stop if no delivery is being made from cross belt 36. It will also be appreciated that scanner EE–1 in any event will continue to call for bars under these conditions. Thus, as they are made available, bars will flow from conveyor 10 to belts 40 and 50. When low inventory switch LS–4 is again tripped the circuitry of wrapper W will now, however, be inoperative until candies have built up so that the scanner eye EE–1 is blocked. In other words, once switch LS–4 is released a backlog of supply must be again built up on belt 40 to block EE–1 before wrapper W operation again commences.

In this respect scanner EE–1 may be considered a double acting switch. Under conditions where low inventory switch LS–4 is tripped and scanner EE–1 senses candy on belt 40, scanner EE–1 serves only to call for more candies as needed from cross belt 36. Under conditions where the low inventory switch LS–4 has been released by absence of candy and thus stops the operation of wrapper W, scanner EE–1 then also serves to re-energize wrapper W but only when (a) switch LS–4 again senses candy and (b) a backlog is present on belts 40 and 50 sufficient for scanner EE–1 to also sense this backlog on belt 40.

In FIGS. 8 and 9 the driving means for moving cross belt 36, discharge belt 40 and infeed adapter belt 50 is shown in schematic form. The main power shaft is at 600. It will be understood that shaft 600 is continually driven, as by the sprocket 601 (FIG. 9), and is dependent for operation on the drive of conveyor 10, all other parts of the apparatus being operative only if conveyor belt 10 is being driven. On shaft 600 is supported the solenoid operated single revolution clutch drive 360 previously mentioned for belt 36. The pawl of this mechanism is indicated at 362, the solenoid for tripping the same being indicated as "Sol. B." The pawl engages a notch in the clutch assembly which includes the sprocket 366 to drive belt roll 368 through a conventional chain drive 367.

Also on shaft 600 is a fixed sprocket 602 drivingly connected by a chain 604 to a sprocket 606 of a shaft 608. Shaft 608 is continually driven by chain 604 and supports sprockets 402 and 502 for driving belts 40 and 50, respectively. The drive roll for belt 40 is at 404 being driven by a chain 406 off sprocket 402. The drive roll for infeed adapter belt 50 is at 504 and is driven as by chain 506 from sprocket 502. Both sprockets 402 and 502 are driven together on shaft 608 whenever a magnetic clutch indicated at 610 is engaged. Clutch 610 is engaged and disengaged through operation of interlocking electrical mechanism as will be described.

It should be noted here that the single revolution clutch drive 360 for belt 36 with pawl 362 being tripped by solenoid B in the manner indicated is schematically shown, such units being available in the trade as standard assemblies, and further that the various single revolution clutch drives previously mentioned for the pusher, elevator, and alignment gate mechanisms are essentially the same type of unit, each being triggered by a solenoid operated pawl means. In FIG. 4 the pusher cam wheel 358 solenoid is indicated as "Sol. A" and the elevator cam 322 solenoid as "Sol. C." The drive means for the alignment gate has been represented at 218 for actuating lifter rod 216 to lower and raise bar 20 and assembly of fingers 210. It will be understood that drive 218 for moving rod 216 is similar to that shown by the pusher cam 358 and link 354 for reciprocating collar 346 of the pusher drive means.

*Wiring diagram*

In an initial start-up of the machine, it may be noted that a normal "running" condition of the interlocking signals to automatically govern proper operation of the various components is not established. In order to establish such operating conditions a "Prime Button" must be actuated. This signals for the cross belt drive action, a pusher cycle and a second cross belt action. When this sequence is simulated, the interlocking mechanism of the automatic feed to belt 50 will then continue as generally described previously, and as will be more specifically set forth in connection with the electrical control mechanism shown by FIG. 8.

Assuming, therefore, that the system is entirely shut down it should be noted first that all operations are dependent upon the motor for the infeed conveyor 10 being energized. Conveyor 10, as previously mentioned, is continually moving. Power lines L–1 and L–2 are, therefore, assumed in FIG. 10 to be supplied with power by first energizing the conveyor motor. In FIG. 10 the circuitry between power lines L–1 and L–2 are shown on lines designated by underlined numerals $\underline{1}$, $\underline{2}$, etc. An "auto" switch S–1 on line $\underline{3}$ must also be closed to energize the circuitry.

The prime push button PB–1 for establishing automatic operation of the circuitry is on line $\underline{17}$. When actuated to set up the interlocking mechanism and assuming candy bars on adapter belt 50 have tripped the low inventory switch LS–4 (line $\underline{19}$), a circuit is connected through to line $\underline{18}$ to energize a control relay CR–12. CR–12 closes contacts of line $\underline{18}$ to by-pass PB–1 through the normally closed contacts in line $\underline{19}$ of a cross belt control relay CR–1.

PB–1 and LS–4 also establish a circuit on line $\underline{19}$ to a control relay CR–9 through a normally open switch of a time delay relay TD–2. Switch TD–2 of line $\underline{19}$ is controlled by a relay TD–2 in line $\underline{21}$. It will also be noted in line $\underline{21}$ that a normally closed switch of a time delay relay TD–1 energizes relay TD–2 and thus closes the switch of line $\underline{19}$. Accordingly, control relay CR–9 is energized.

Relay CR–9 controls the circuitry for operation of the infeed gate mechanism G of the wrapping machine W and thus the advancing of candy bars from belt 50. When energized bars can feed into wrapper W and when de-energized it opens the circuit of the infeed gate (see line $\underline{2}$).

Also when energized CR–9 closes contacts in line $\underline{20}$ around switch TD–2 to render this relay directly under the control of LS–4 sensing candies on the infeed adapter belt 50 as previously related.

In addition, CR–9 closes contacts in line $\underline{14}$ to a control relay CR–8 which controls the magnetic clutch drive of belts 40 and 50 (see contacts line $\underline{26}$). In line $\underline{14}$ are also located normally open contacts of a control relay CR–11. Relay CR–11 is in the infeed control circuit of the wrapper W and is thus energized (with the contacts in line $\underline{14}$ closed) when such infeed control is energized. Assuming that CR–11 contacts are closed control relay CR–8 is thus energized. If the wrapper W is not operative, however, the circuit to drive belts 40 and 50 cannot operate through CR–11.

It will be noted in this connection that during normal operation the scanning eye EE–1 of belt 40 is energized if it sees light and thus energizes CR–1 on line $\underline{3}$ to run cross belt 36 by energizing solenoid B of line $\underline{30}$. When cross belt 36 is once actuated, the belts 40 and 50 will continue to be driven by tripping the limit switch LS–3. This result of this switch action will be seen in line $\underline{10}$ and $\underline{11}$ whereby a relay CR–7 is actuated. Contacts of CR–7 are closed in line $\underline{15}$ and also in line $\underline{13}$. In line $\underline{13}$ a time delay TD-1 acts to close the switch TD-1 in line 15 and so place CR-8 in circuit. Accordingly, whether relay CR-11 of the wrapper W remains energized or not, once the the cross belt starts and switch LS-3 is tripped, relay CR-8 will remain in circuit to actuate the magnetic clutch until LS-3 is untripped.

During the "priming" operation relay CR-8, when energized, also closes contacts in a by-pass line 16 as will be later described. More directly, CR-8 closes the contacts in line 26 to render the magnetic clutch 610 active and in driving engagement. The magnetic clutch thus runs belts 40 and 50 to feed candy bars into the wrapper machine W. This action results in eye EE-1 again seeing light on belt 40, if it does not already see light, and thus closes the normally open contacts in line 3. By closing EE-1 contacts in line 3 (and assuming of course, that the pusher is retracted maintaining switch LS-1 closed) relay CR-1 is energized.

CR-1 when energized opens contacts in line 19 and closes contacts on line 30. The solenoid B of the cross belt clutch is thus energized through the normally closed contacts of a relay CR-7. This imparts the single revolution drive cycle previously described to cycle cross belt 36.

Also as previously mentioned, movement of the cross belt 36 actuates the limit switch LS-3. This switch opens a circuit in line 10 to a pusher control relay CR-6. CR-6 is a cross belt pusher control and maintains the circuit in line 29 to the pusher solenoid A open during cross belt movement. The pusher, therefore, cannot operate while the cross belt operates.

LS-3 when tripped also closes a switch in line 11 to energize a control relay CR-7. This relay first closes contacts in line 10 to render the control relay CR-6 active when switch LS-3 in line 10 is un-tripped and again closed at the end of cross belt movement. Next, it closes contacts in line 12, by-passing the switch of LS-3 in line 11. In addition CR-7 closes contacts in line 13 to energize the time delay relay TD-1. Relay TD-1 closes a switch in line 15 and opens a switch in line 21. CR-7 also closes contacts in line 15 by-passing the contacts of CR-11 and CR-9 in line 14 through the now closed switch of TD-1 to CR-8. Thus as above mentioned, the magnetic clutch (line 26) to drive belts 40 and 50 will remain in driving condition while belt 36 is being driven even though the control circuit of wrapper W may be opened.

Finally, CR-7 opens contacts in line 30. This operates to de-energize solenoid B of the cross belt clutch so that at the end of its single revolution drive, the drive of belt 36 will stop by re-engagement.

It is to be noted that when the time delay relay TD-1 in line 13 times out, the circuit in line 15 to CR-8 is opened. This means that if CR-8 is not energized by either the wrapper W or the LS-4 circuitry then belts 40 and 50 will stop when belt 36 stops.

Referring again to the fact that LS-3 is untripped at the end of the cross belt movement, CR-7 remains active by reason the closed contacts of line 12. The contacts of CR-7 in line 10 also remain closed and thus CR-6 is now energized (line 10) to initiate pusher action.

CR-6 will first open the normally closed contacts in line 13 and cut out TD-1. It will close contacts in line 19 and also contacts in line 29 of the circuit to solenoid A to actuate the pusher drive.

It is to be noted here that in line 9 contacts associated with the "Prime" button PB-1 initially were closed to energize a control relay CR-5 of line 7 and hold it energized by reason of closed contacts of CR-5 of line 8. This action by-passed the normally open switch of limit switch LS-2 (elevator up) in line 7.

Control relay CR-5 of line 7 when energized also closed contacts in line 6 so as to energize the pusher control relay CR-4 through the closed switch of limit switch LS-2. In other words, if the elevator is in its up position, relay CR-4 will be energized to close the contacts of line 29 and energize solenoid A of the pusher mechanism and commence a pusher stroke across elevator belt 30 to cross belt 36. It will be seen that if the elevator is not in its up position, the circuit to relay CR-4 will remain open and the pusher cannot be operated.

As soon as the pusher movement commences this action will open switch LS-1 and de-energize control relays CR-1 to CR-7 inclusive. Thus during pusher movement neither the elevator nor the cross belt may be operated.

On completion of the pusher cycle and return to retracted position switch LS-1 is again closed. This will enable eye EE-1 (as soon as the time delay TD-1 of line 13 times out and brings the light in line 21 in circuit) to again sense no candy bars at its position on belt 40 and then close contacts in line 3. This again energizes control relay CR-1 and solenoid B (line 30) through normally closed contacts CR-7 so as to repeat the cross belt movement previously described.

Once the sequence of cross belt action, pusher cycle, and a second cross belt action has taken place or been simulated in the absence of candy bars on the elevator the interlocking mechanism for automatic feeding movement to the discharge belt will continue.

Assuming, normal running operation with candy bars on belts 40 and 50 being advanced through the infeed gate to wrapper W, the sequence as described will result in no candy bars being present on either the cross belt 36 or the elevator belt 30. Thus elevator operation will now be actuated.

The circuitry for elevator operation will be initiated through the action of the scanner eye EE-2 whether the eye EE-1 of belt 40 signals for a cycle of cross belt 36 or not. EE-1 may "see" light after "priming" and relay CR-1 will be actuated to close contacts in line 30 but cross belt 36 will not run through its cycle because relay CR-7 has remained in circuit after cross belt action and opened the contacts of line 30 in the circuit to the cross belt solenoid B.

Elevator eye EE-2 will operate first to initiate elevator action and then a pusher action inasmuch as cross belt 36 is empty. Control relay CR-3 (line 5) governs the elevator action through contacts on line 30 to solenoid C. EE-2 scanning bars on conveyor belt 10 will see light or not depending on the position of the bars on the belt.

If EE-2 "sees" no light, because of a row of bars blocking its beam across belt 10, it will subsequently see light and the first set of EE-2 contacts on line 5 will be closed to activate a control relay CR-2 (line 4). This closes the CR-2 contacts on lines 4 and 5. However, the second set of normally closed contacts of EE-2 on line 5 to CR-3 are opened and therefore relay CR-3 cannot at this time energize elevator solenoid C (line 31). When EE-2 again "sees" dark on picking up the leading edge of an aligned row of candy bars, the first set of contacts of line 5 are opened and the second set closed. The closing of the second set will then energize the relay CR-3 by means of the CR-2 contacts of line 4.

It will be noted relay CR-3 is energized, however, only if CR-5 is inactive and maintains the normally closed set of contacts in line 5 in closed condition, and in addition holds the CR-5 set of contacts of line 6 open so that the pusher solenoid circuit (CR-4) remains open. In other words, the elevator can operate only if the pusher mechanism is not operative. CR-5 is inactive since switch LS-2 is not tripped with the elevator in its "up" position. It will be recalled that the previous pusher stroke de-energized CR-5 by tripping LS-1 and that CR-5 (see lines 6 and 7) is normally brought into circuit only by tripping switch LS-2 by an elevator cycle.

If EE-2 does initially see light, it will, as described, first close the first set of contacts on line 5 and energize CR-2. The two sets of contacts of CR-2 are then closed in line 4 (to keep CR-2 in circuit) and on line 5. The normally closed second set of EE-2 contacts in line 5, however, are open so that CR-3 remains inactive until EE-2 subsequently picks up a leading edge and "sees" dark to connect the circuit in lines 4 and 5. Relay CR-3 when in circuit closes the circuit of line 31 to elevator solenoid C.

The elevator then lowers to pick up a row of bars as previously described. When lowered limit switch LS–2 is tripped (see lines 6 and 7). In line 6 the circuit is opened to CR–4 and thus the pusher solenoid A of line 29 cannot operate. In line 7 the circuit to CR–5 is closed. This opens the circuit in line 5 to de-energize the elevator clutch relay CR–3 and solenoid C (of line 31) and thus to stop the elevator drive at the conclusion of its single revolution and return to upper position.

On actuating relay CR–5, the contacts in line 8 are closed to maintain CR–5 in circuit when LS–2 is untripped (i.e. again closed). The remaining set of CR–5 contacts in line 6 are also closed to keep CR–4 in circuit when LS–2 is untripped.

Thus when the elevator returns with candy bars to its upper position the CR–4 contacts on line 29 are closed in circuit to the pusher solenoid A. If will also be realized that the "priming" cycle ended with the cross belt drive and, therefore, control relay CR–6 remains in circuit through the sequence of the "tripped" and "untripped" condition of LS–3. Thus the pusher solenoid A will now be energized, by the closed contacts of CR–6 and CR–4 of line 29, to push candy bars from belt 30 to cross belt 36. The pusher cycle has been previously described. Bars will be deposited on cross belt 36 and trip the pusher limit switch LS–1 to prevent operation of the elevator or cross belt.

On return of the pusher to its retracted condition limit switch LS–1 is untripped (i.e., again closed) and sets up the circuitry of CR–1 to CR–7 inclusive to again allow automatic operation of the elevator under the control of the eye EE–2 to pick up another row of bars. It will be noted also that cross belt 36 drive may now be operated by the eye EE–1 of discharge belt 40 since the CR–7 contacts of line 30 are now closed.

In the event that no call is made for candy bars by EE–1, bars will be present on cross belt 36 and also on elevator belt 30. The pusher will, therefore, not operate since LS–1 had been tripped by the previous pusher cycle (contacts CR–6 are open in line 29 to solenoid A), and the cross belt drive must first trip LS–3 in order to bring relay CR–6 in circuit and close the contacts to pusher solenoid A in line 29. In other words belt 36 must be "cleared" (i.e., LS–3 tripped) before the pusher can operate. And, as has been described the pusher must first "clear" the elevator belt before the elevator can operate because the previous elevator cycle has caused LS–2 to bring CR–5 in circuit and thus open the CR–5 contacts in line 5 to relay CR–3 controlling the elevator solenoid C.

With reference to a failure of the wrapper W and operation of the circuitry, a breakdown of the wrapper would cause the relay CR–11 of the infeed control to be de-energized. This opens the CR–11 contacts in line 14 to relay CR–8 which in turn will stop the magnetic clutch drive of the discharge and adapter belts (CR–8 contacts line 26) unless the cross belt is running and has tripped LS–3 to bring the time delay relay in operation to by-pass the CR–11 contacts of line 14 and maintain CR–8 actuated through the closed switch TD–1 of line 15. When cross belt action stops belts 40 and 50 (CR–8) will remain out of operation unless EE–1 on belt 40 signals for cross belt operation again.

Assuming a row of candy bars is on the raised elevator the pusher can still deliver to the cross belt and the cross belt to the discharge belt if the eye EE–1 signals for candy bars. If the eye EE–1 does not so signal, the pusher will nevertheless fill the cross belt, retract and allow the elevator to pick up a row of candy bars from belt 10. The backlog of candy bars will then be complete and ready for wrapper W operation as soon as necessary repairs are made or the wrapper W is adjusted and the circuits connected to again energize CR–11, the gate infeed G, and thus resume delivery.

With reference to circumstances where a supply of candy bars transferred from conveyor belt 10 becomes insufficient for any reason to maintain a backlog on adapter belt 50 and the arm of LS–4 in raised position, this switch (line 19) will open. Relay CR–12, CR–9, in lines 18 and 19 will then be out of circuit.

This condition also opens the circuit to CR–8 (line 14) and stops the magnetic clutch, unless as previously described the cross belt tripping of LS–3 maintains the relay CR–8 energized by reason of the time delay relay TD–1.

Also when LS–4 opens, the contacts of CR–9 to the mechanical infeed gate G of wrapper W are opened. Wrapper W will, however, continue to actuate relay CR–11 and be ready to accept candy bars once a backlog of product is built up on belts 40 and 50 to place the gate in operation again.

Under these conditions the discharge belt eye EE–1 continues to call for product and closes the contacts in line 3 for cross belt control relay CR-1 to energize cross belt solenoid B clutch (line 31). When this occurs LS–3 is tripped and in turn energizes the magnetic clutch and time delay TD–1.

If candy bars are already on the cross belt 36 they will be delivered on belt 50 up to the closed infeed gate. Delivery operations will then continue so as to build a backlog of bars until LS–4 is tripped (i.e., closed).

If the cross belt has no candy bars, the pusher may be going through its cycle and cross belt action will necessarily await completion of the pusher cycle.

In on the other hand, the elevator is going through a cycle to pick up a row of bars, this elevator cycle must be completed before any pusher action is possible.

In this last situation the cross belt solenoid B (line 30) can operate without delivering bars to the discharge belt. And the cross belt cycle, of course, must be completed before pusher action can deliver bars to it.

It will be noted that an inventory of candy bars must be built up to trip the low inventory switch LS–4 and in addition interrupt the electric eye EE–1 on belt 40 before the relay CR–9 will close the contacts to bring the infeed gate G in circuit.

When building up the backlog of inventory on belt 50, LS–4 will first be closed. This will not, however, as stated energize the infeed gate control relay CR–9 of line 19. In the circuit of line 19 the switch of time delay relay TD–2 remains open during the process of building up such a backlog on the discharge and adapter infeed belt area. This will be appreciated from the fact that the time delay relay TD–1 in line 13 which takes over as an interlock to keep the magnetic clutch energized (that is CR–8) also opens the TD–1 switch in line 21 to the time delay relay TD–2 (and the light of EE–1). As has been previously mentioned, the time delay TD–1 does not drop out until the expiration of a preset period of time after the cross belt has stopped. This period of time allows any candy bars delivered from the cross belt to pass the electric eye EE–1 on belt 40 before the switch TD–1 in line 21 again turns on the light (line 22) of EE–1.

Accordingly, when the switch TD–1 in line 21 is closed by the relay TD–1 timing out, the electric eye EE–1, if it sees light, will again energize CR–1 in line 3 and open the contacts in line 19 to maintain relays CR–9 and CR–12 out of circuit.

Thus it will be seen that the circuit to relay CR–9 will be open until such time as a backlog of candies is built up to block the eye of EE–1. Once this condition is established, the switch of TD–1 closes in line 21 and permits relay TD–2 to close the switch of TD–2 in line 19. Also in line 19 the normally closed contacts of CR–1 remain closed because the eye EE–1 is blocked. It will further be noted that the normally open contacts of CR–6 will be closed by reason of the relay CR–6 being energized at the end of the cross belt drive action as has been previously described. Accordingly, the circuit to CR–12 and CR–9 will again be established and thus the contacts of CR–9 of the wrapper infeed gate G will be closed. Feeding of bars into the wrapper machine W, therefore, may again proceed as in the normal operation described.

Referring now to the alignment gate circuitry controlling the solenoid operated single revolution clutch drive indicated generally at 218 (FIG. 3) for raising and lowering gate 20 and associated alignment fingers on conveyor belt 10, a simplified wiring diagram thereof is shown by FIG. 11. It should be noted that this circuit for the alignment gate is completely independent of the circuitry above described in connection with FIG. 10 for controlling the elevator, cross belt, and discharge mechanism.

As indicated by FIG. 11 a switch controls the circuit for the power lines between which are connected the electric eye scanning mechanism EE-3 and the circuit for the solenoid "Sol. D" controlled by the normally closed contacts EE-3. When the scanner EE-3 "sees" light between the rows on conveyor 10 the contacts are open, "Sol. D" is inoperative and the gate is held in its upper raised position. As soon as EE-3 detects the leading edge of the foremost candy bar of a row of bars approaching the gate area, the light of the scanner is blocked and the contacts are then closed and thus energize the solenoid for commencing a single revolution of the clutch drive. In this cycle the gate is lowered, dwells at its lower position for aligning the bars, and is again raised. The timing of the single revolution drive as previously indicated is sufficient for the lagging bars of the row to contact gate 20. When the gate is raised all bars are in alignment.

The timing of the gate cycle, the speed of conveyor 10 and the spacing of the successive rows on conveyor 10 are furthermore so related that as one gate cycle is completed and the gate and fingers are again in their upper positions, the scanner EE-3 will not as yet have detected a leading bar of the following row. In other words, the scanner will be seeing light at the end of each gate cycle and be in a condition to detect the next row as soon as the leading edge thereof strikes the light beam.

What is claimed is:

1. In conveyor distributing apparatus having
   longitudinally spaced receiver belts with driving mechanisms for carrying cross-wise rows of candy bars and like articles along a conveyor path,
   vertically reciprocable belt means between receiver belts for carrying a row of articles from the end of a receiver belt into an offset position relative to said conveyor path,
   cross belt means adjacent said offset position of the vertically reciprocable belt means and movable transversely of said conveyor path for receiving rows of articles and discharging the same in single file laterally of said first conveyor path, and
   article releasing means supplied by said cross belt,
   the improvement which comprises:
   reciprocable pusher means movable in a path to engage and transfer a row of articles in said offset position of the vertically reciprocable belt means to the said cross belt means,
   the said vertically reciprocable belt means having means to carry succeeding rows of articles along said conveyor path from one receiver belt to the next when one row of said articles is carried into said offset position,
   and means for separately actuating the said vertically reciprocable belt means, pusher means and cross belt means in sequential steps including control mechanism preventing operation of any one of these last named means simultaneously with the operation of another of said named means which immediately precedes and immediately follows it in said sequence of steps in advancing said articles.

2. The apparatus of claim 1 in which
   a vertically reciprocable gate means positioned above the first of said receiver belts is provided with a stop member to transversely align the articles of the crosswise rows on the receiving conveyor, and
   a scanner mechanism detecting an edge of the leading article of a row is operable to lower said gate to hold the articles and align all leading edges thereof and thereafter release said row for further travel on the conveyor,
   said gate means further including a series of transversely arranged, closely spaced and freely pivotable fingers which are vertically movable with said gate for individual fingers to drop between the articles during the alignment thereof, and
   said pusher means is also provided with closely spaced, freely pivotable fingers for similar engagement thereof between articles during movement of a row onto said cross belt.

3. The apparatus of claim 1 in which
   said offset position of the vertically reciprocable belt means is above the path of conveyor travel and said vertically reciprocable means includes,
   an elevator provided with vertically spaced upper and lower movable belts having a cycle of operation in which said spaced belts are lowered to position said upper belt at the level of the receiver belt, receive a row of articles, and then be raised to said offset position,
   a scanner mechanism adjacent the end of a receiver belt for initiating said elevator cycle, and
   means for constantly driving said lower belt from the driving mechanism of the receiver belt with means engageable to drive the upper belt and the lower belt together during the lower portion of reciprocable travel of said elevator.

4. The apparatus of claim 1 in which
   a discharge belt and a wrapping machine infeed adapter belt are aligned with the cross belt and are each provided with driving means having a common actuating means,
   said article releasing means is positioned at the end of the adapter belt,
   and a control means for said common actuating means is interconnected with the control mechanism for actuating said cross belt means, said control means including,
   a low inventory limit switch for sensing articles on said adapter belt, and
   article scanning means for sensing articles positioned along said discharge belt,
   said low inventory switch, in the absence of articles to sense, stopping said common actuating means when said cross belt is not operating, and
   said article scanning means, when no articles are sensed thereby, actuating said control means to commence operation of said cross belt means when said pusher means is not operating.

5. The apparatus of claim 4 in which
   said adapter belt is driven at a slower rate of speed than said discharge belt,
   said article releasing means is an intermittently operated gate member,
   control mechanism for operating the gate is interconnected with the said control means for said common actuating means, and
   said low inventory switch being effective to stop operation of said gate member in the absence of articles to sense on the adapter belt and the failure of said gate control mechanism to render the gate operative serving to stop said common actuating means when said cross belt is not operating.

6. The apparatus of claim 5 in which
   said control mechanism for operating the elevator, pusher means, and cross belt; said control means for actuating the common driving means for the discharge and adapter belts, and said controls mechanism for operating the gate, are electrically operated, the said operating means for the elevator, pusher means, and cross belt, and tricle releasing gate and each actuated by solenoid operation, said common actuating means for the discharge and adapter belts is a magnetic clutch drive, and said alignment gate means is solenoid operated by an electric circuit independent from the circuitry of the aforesaid electrically operated mechanism.

7. Conveyor apparatus for receiving rows of candy bars and like articles and distributing said articles at infeed stations adapted for single line delivery to wrapping machinery comprising:

receiving conveyor means having a plurality of belts aligned in spaced end to end relation for transporting longitudinally separated cross-wise rows of articles, and means located along the path of at least the first of said belts for transversely aligning the leading edges of articles in each row, discharge conveyor means driven transversely of said receiving conveyor and positioned laterally adjacent the spacing between the ends of each pair of belts thereof for accepting a row of articles removed from the first conveyor and transporting the same in single line, infeed adapter conveyor means at the end of said discharge conveyor driven at a lower rate of travel than the discharge conveyor and having an infeed holding gate to close the spacing between articles thereof for timed infeeding to wrapping machinery, elevator means for removing a row of articles from a receiving conveyor belt and delivery to a discharge conveyor means, said elevator means having a lower belt to advance the rows from one belt to a succeeding belt of said receiving conveyor, an upper belt to receive a row at the receiving conveyor belt level and elevate it to a raised position, means to simultaneously lower and raise said lower and upper belts, a cross belt above the first conveyor adjacent said raised position of the upper belt for cross-wise travel and single line delivery of articles to said discharge conveyor, and pusher means to transfer a row of articles from the upper belt and position the same on said cross belt, said named conveyor and belt means, said elevator means and said pusher means having means for operating the same, said operating means including control mechanism for sequential operation in advancing said rows of articles from the receiving conveyors to an infeed adapter conveyor, said control mechanism also having interlocking means preventing simultaneous operation of the means associated with any two adjacent steps in the advance of said articles from the said elevator means to said cross belt, said interlocking means also permitting operation of each advancing step to the cross belt only when the means associated with the next succeeding step is free of articles.

8. The conveyor apparatus of claim 7 in which scanning means are provided to sense articles on said discharge conveyor and in the absence thereof to signal for operation of said cross belt.

9. The conveyor apparatus of claim 8 in which a low inventory switch means is provided on said infeed adapter conveyor and is responsive to the absence of articles to stop said discharge and adapter conveyors when said cross belt is not operating.

10. The conveyor apparatus of claim 9 in which said discharge conveyor sensing means and said infeed conveyor low inventory switch means are electrically controlled, and means are provided in the circuitry thereof for again operating said infeed holding gate, after said low inventory switch means has stopped the same, only under conditions where the switch means and the sensing means together detect articles on both conveyors.

References Cited
UNITED STATES PATENTS 2,536,756    1/1951    Lopez _____ 198—20

RICHARD E. AEGERTER, *Primary Examiner.*

U.S. Cl. X.R.

198—31